(12) United States Patent
Schoenborn

(10) Patent No.: US 7,200,186 B2
(45) Date of Patent: Apr. 3, 2007

(54) METHODS AND APPARATUS FOR REDUCING POWER USAGE OF A TRANSMITTER AND RECEIVER COUPLED VIA A DIFFERENTIAL SERIAL DATA LINK

(75) Inventor: Zale T. Schoenborn, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 10/097,338

(22) Filed: Mar. 14, 2002

(65) Prior Publication Data
US 2003/0185308 A1   Oct. 2, 2003

(51) Int. Cl.
*H03K 9/00* (2006.01)
*H03K 5/19* (2006.01)

(52) U.S. Cl. .......................................... 375/316; 327/20
(58) Field of Classification Search ................ 375/316, 375/318; 327/20, 18, 1
See application file for complete search history.

(56) References Cited

U.S. PATENT DOCUMENTS

| | | | |
|---|---|---|---|
| 5,512,874 A * | 4/1996 | Poston .................. 340/426.26 |
| 5,523,703 A * | 6/1996 | Yamamoto et al. ............ 326/30 |
| 5,666,068 A | 9/1997 | Ehmann |
| 5,686,872 A * | 11/1997 | Fried et al. ................ 333/22 R |
| 5,731,711 A * | 3/1998 | Gabara ......................... 326/30 |
| 5,959,472 A | 9/1999 | Nagamatsu et al. ......... 327/108 |
| 6,034,551 A | 3/2000 | Bridgewater, Jr. |
| 6,085,325 A | 7/2000 | Jackson et al. |
| 6,094,094 A * | 7/2000 | Ohtake ........................ 327/560 |
| 6,157,974 A | 12/2000 | Gasparik |
| 6,307,401 B1 | 10/2001 | Bridgewater, Jr. |
| 6,317,839 B1 * | 11/2001 | Wells ......................... 713/320 |
| 6,320,406 B1 * | 11/2001 | Morgan et al. ................ 326/14 |
| 6,339,344 B1 * | 1/2002 | Sakata et al. ................. 326/83 |
| 6,411,146 B1 * | 6/2002 | Kuo ........................... 327/198 |
| 6,445,730 B1 * | 9/2002 | Greszczuk et al. ......... 375/219 |
| 6,460,143 B1 | 10/2002 | Howard et al. |
| 6,552,578 B1 * | 4/2003 | Cheung et al. ............... 327/26 |
| 6,593,801 B1 * | 7/2003 | Hattori ........................ 327/544 |
| 6,622,178 B1 | 9/2003 | Burke et al. |
| 6,724,891 B1 * | 4/2004 | Huang et al. ........... 379/399.01 |
| 6,791,371 B1 * | 9/2004 | Cheung ........................ 327/63 |
| 6,831,548 B1 | 12/2004 | Eber et al. |

(Continued)

FOREIGN PATENT DOCUMENTS

| | | |
|---|---|---|
| EP | 0788059 A | 8/1997 |
| KR | 2001-31115 | 4/2001 |

OTHER PUBLICATIONS

*International Preliminary Examination Report* for Internatinal Patent Application No. PCT/US03/01531 (mailed Jun. 7, 2004).

(Continued)

*Primary Examiner*—Chieh M. Fan
*Assistant Examiner*—Jason M. Perilla
(74) *Attorney, Agent, or Firm*—Hanley, Flight & Zimmerman, LLC

(57) ABSTRACT

Methods and apparatus are disclosed for using in-band signal(s) over a differential serial data link to reduce power usage of a transmitter and receiver coupled by the link.

5 Claims, 6 Drawing Sheets

U.S. PATENT DOCUMENTS

2002/0017920 A1    2/2002   Bridgewater, Jr.
2003/0174762 A1    9/2003   Schoeborn
2003/0198296 A1*  10/2003   Bonelli et al. .............. 375/257

OTHER PUBLICATIONS

International Search Report dated Aug. 3, 2004 for corresponding Internatinal Application Serial No. PCT/US03/01531 and transmittal letter (9 pages).

Notice of Preliminary Rejection in Korean Patent Application No. 10-2004-704493 (corresponding to U.S. Appl. No. 10/097,338), mailed Jul. 29, 2006.

*Invitation to Pay Additional Fees*, including *Annex to Form PCT/ISA/206, Communication Relating to the Results of the Partial International Search for PCT/US03/01531*, mailed Dec. 12, 2003 (4 pages).

* cited by examiner

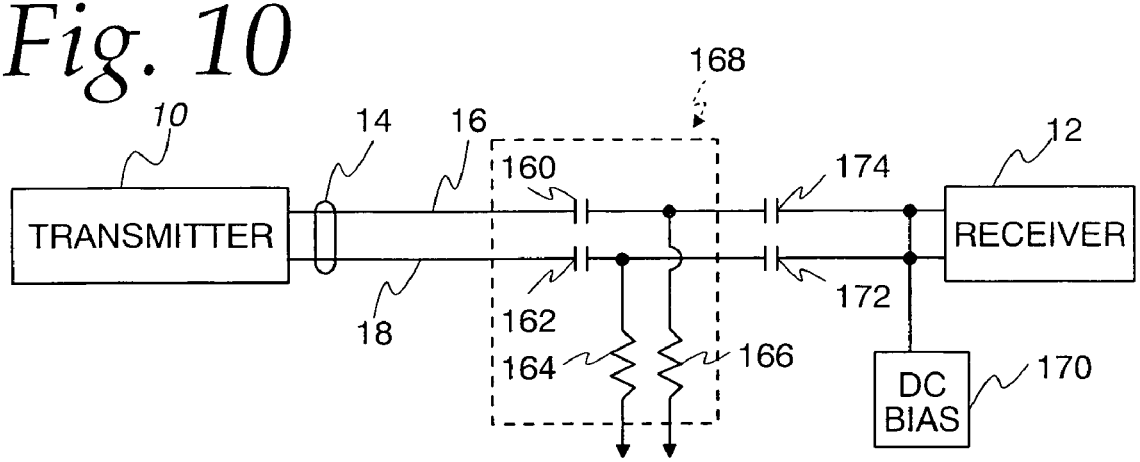
Fig. 10
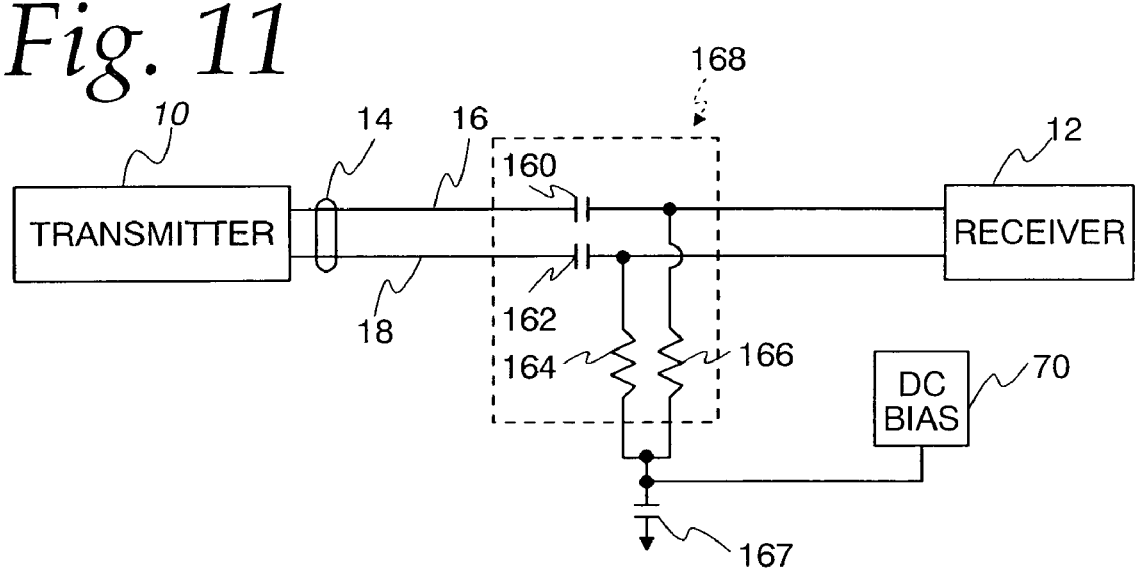
Fig. 11
Fig. 12
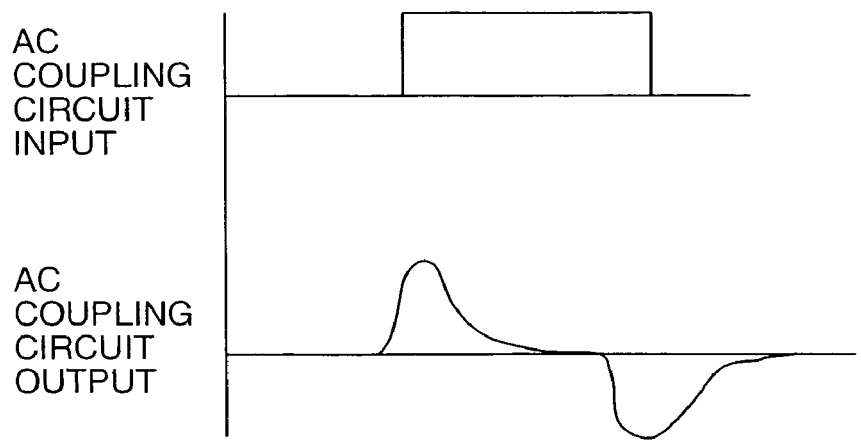

METHODS AND APPARATUS FOR REDUCING POWER USAGE OF A TRANSMITTER AND RECEIVER COUPLED VIA A DIFFERENTIAL SERIAL DATA LINK

FIELD OF THE INVENTION

The invention relates generally to differential communication links, and, more particularly, to methods and apparatus for reducing power usage of a transmitter and receiver coupled via a differential serial data link.

BACKGROUND OF THE INVENTION

For the last ten years, the Peripheral Component Interconnect (PCI) standard has been used for connecting peripheral devices (e.g., network cards, modems, graphics cards) to microprocessors in computers and other devices. PCI is a bus technology that transfers synchronized data over several (typically 32–64) parallel channels. PCI and PCI-X (Peripheral Component Interconnect Extended) have throughputs ranging from 133 MBps to 1.1 GBps.

It is widely known that microprocessor speeds have dramatically increased over the years. While the PCI and PCI-X standards are currently sufficient to transfer data between processors and input/output (I/O) devices, if processor speeds continue to increase as expected, the PCI standard will soon become obsolete because increasing the speed of the PCI standard beyond its current limits is prohibitively expensive.

With this in mind, a new I/O architecture has recently been developed. That architecture is currently referred to as the Third Generation Input Output (3GIO) interface standard. Unlike PCI, 3GIO (sometimes referred to as Arapahoe) is a point to point serial communication technology. Rather than including a bus of 32 or 64 channels sending synchronized data, 3GIO uses many fewer channels to transfer data which is not synchronized. (The data transferred in the 3GIO standard includes an embedded clock signal which is used to synchronize the transmitter and the receiver.) The 3GIO architecture is much faster than the PCI and PCI-X standards. It currently permits data transfer at 2.5 Gbit/sec, and is expected to scale upward to the theoretical limits of copper (i.e., 10 Gbit/sec).

The basic link of the 3GIO architecture is a low voltage differentially driven connector pair. If communication is desired in both directions, two low voltage differentially driven connector pairs are used, namely, a transmit pair and a receive pair. The bandwidth between devices can be scaled upward by adding connector pairs to form multiple communication channels. However, the differential link remains the basic communication channel between two devices within the 3GIO architecture.

Known differential serial link protocols prior to 3GIO constantly switched data over the differential links. When a transmitter using these earlier protocols has no actual data to transfer, dummy data is transferred over the link. Transferring dummy data in this manner is particularly desirable in the context of AC coupled and/or AC terminated differential links because the voltage on a quieted line (i.e. one without the dummy data) would drift as the AC coupling and/or AC termination capacitor discharged and subsequently recharged. This voltage could possibly take the line out of the range of the receiver.

Such undesirable drift could also occur over time when actual data is being transmitted. To avoid such undesirable drift when actual data is being transmitted, coding schemes such as 8B10B (i.e. 8 bit/10 bit) are used in differential links employing AC coupling. The dummy codes mentioned above and the 8B10B codes are selected to make sure the DC voltage level on both sides of the AC coupling capacitor stay substantially level (i.e., as many "1" bits as "0" bits are transmitted during each predetermined time period to avoid undesirable charging/discharging of the coupling capacitors).

Because of this concern with voltage drifting, power management techniques are not frequently used with differential serial data links. To the extent power management techniques are used, entry to and exit from the power management state is driven by side band signals. However, these side band techniques are disadvantageous in that they require side band communication lines and involve high latency periods.

BRIEF DESCRIPTION OF THE DRAWINGS

FIG. 10 is a circuit diagram of a differential link employing AC coupling and DC termination.

FIG. 11 is a circuit diagram of a differential link employing AC coupling and AC termination.

FIG. 12 is a diagram showing an in-band wake-up signal input to an AC coupling circuit, and a possible output of the AC coupling circuit in response to that wake-up signal.

DESCRIPTION OF THE EXAMPLES

Although the apparatus and methods disclosed herein are particularly well suited for use with differential serial data links operating in accordance with the 3GIO standard, persons of ordinary skill in the art will readily appreciate that the teachings of the invention are in no way limited to the 3GIO context. On the contrary, persons of ordinary skill in the art will readily appreciate that the teachings of the invention can be employed with any differential serial data link regardless of the communication protocol it employs.

Figure 1:
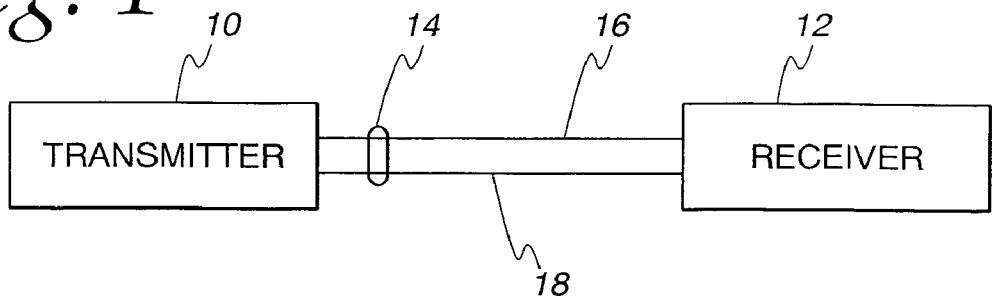
FIG. 1 is a schematic illustration of an example transmitter and receiver connected by a differential serial data link.

A transmitting device 10, a receiving device 12 and a differential serial data link 14 are shown in FIG. 1. For purposes of simplicity of illustration, only one differential pair of lines 16, 18 is shown in the differential link 14 of FIG. 1. However, persons of ordinary skill in the art will appreciate that additional pairs of differential lines may be included if, for example, bi-directional communication and/or additional bandwidth is desired for the link 14.

Figure 2:
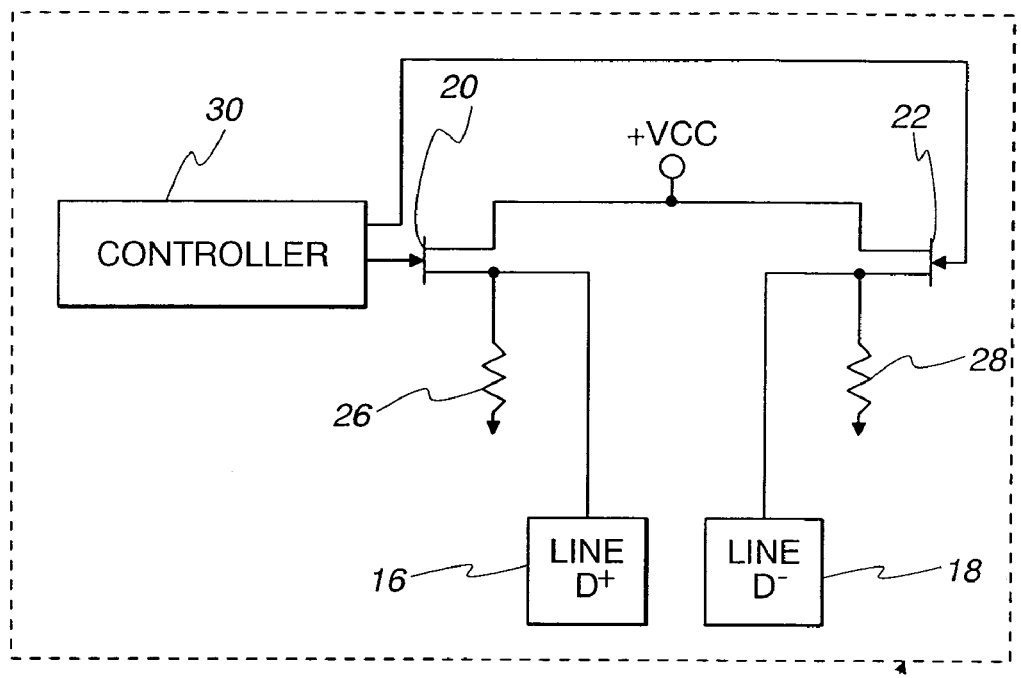
FIG. 2 is a more detailed view of the transmitter of FIG. 1.

The transmitter 10 develops and transmits differential signals over the differential link 14. The transmitter 10 can operate in accordance with any known serial data link protocol, for example, 3GIO, infiniband, xaui, SATA, etc. and can be constructed in any number of ways. A schematic illustration of one exemplary implementation of a transmitter 10 is shown in FIG. 2. Although the illustrated transmitter 10 is a current mode driver, persons of ordinary skill in the art will appreciate that a voltage mode driver could likewise be employed in this role.

For the purpose of developing high speed difference signals to be transmitted over the lines 16, 18 of the serial link 14, the transmitter 10 is provided with a pair of transistors 20, 22. The transistors 20, 22 can be implemented by, for example, MOSFETS as shown in FIG. 2 or by any other type of controlled switching device. As shown in FIG. 2, one terminal of each of the transistors 20, 22 is coupled to a power supply. The opposite terminal of each transistor 20, 22 is tied to ground through a driver termination impedance 26, 28. The base of each transistor 20, 22 is in communication with a controller 30. The controller 30 (which may, for example, be implemented by a programmed microprocessor), turns the transistors 20, 22 on and off at opposite times to develop and transmit a difference signal over the lines 16, 18 of the serial link 14.

More specifically, the controller 30 is provided with digital data to be transmitted over the serial link 14. This data is stored in a queue (not shown) associated with the controller 30. At least when the queue contains data for transmission, the controller 30 switches the transistors 20, 22 on and off in accordance with the communication protocol being used to send voltage difference signals representative of the data from the queue over the differential link 14. As shown in FIG. 2, the driver termination impedances 26, 28, which are preferably implemented by resistors, function to bias the lines 16, 18 to a DC voltage at least when the transmitter 10 is transmitting data via the transistors 20, 22. To transmit a logic value "1," the controller 30 switches one of the transistors 20 on and the other transistor 22 off for a predetermined time period to create a voltage difference on the differential link 14 with line 16 at a higher potential than line 1114 18. To transmit a logic value "0," the controller 30 switches transistor 22 to a conducting state and transistor 20 to a non-conducting state for the predetermined time period to create a voltage difference on the link 14 with line 18 at a higher potential than line 16.

The changes in the relative potentials of the lines 16, 18 are received at the receiver 12. As with the transmitter 10, the receiver 12 can operate in accordance with any known serial data link protocol (e.g., 3GIO, infiniband, xaui, SATA, etc.), and can be constructed in any number of ways. A schematic illustration of one exemplary implementation of a receiver 12 is shown in FIG. 3.

For the purpose of receiving and interpreting the data signals carried by the serial link 14, the receiver 12 is provided with a difference detector 34. As will be appreciated by persons of ordinary skill in the art, the difference detector 34 can be implemented in many ways. By way of example, not limitation, the difference detector 34 can be implemented by a conventional differential operational amplifier. Preferably, the operational amplifier is selected to have high gain.

Figure 3:
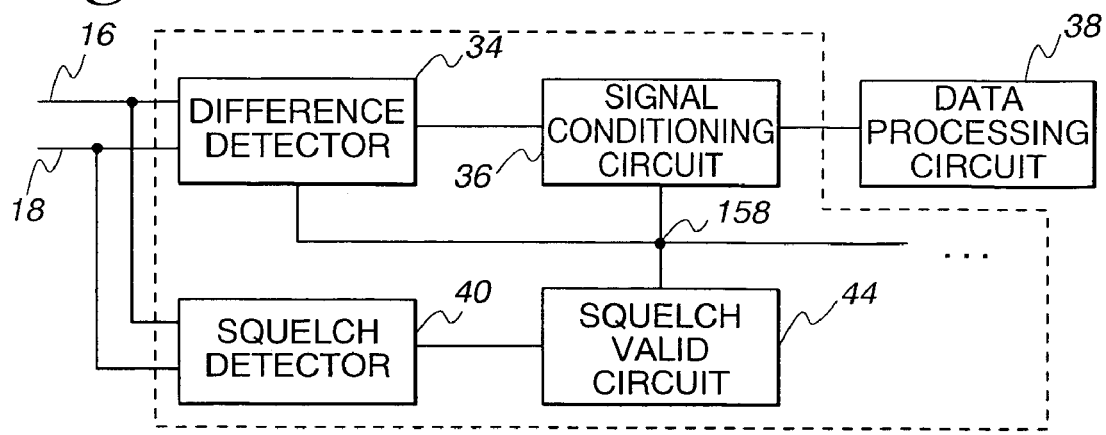
FIG. 3 is a schematic illustration of the receiver of FIG. 1, shown with a squelch detector constructed in accordance with the teachings of the invention.

As shown in FIG. 3, the output of the difference detector 34 is communicated to a conventional signal conditioning circuit 36. Signal conditioning circuit 36 contains various conventional circuitry such as filters, amplifiers and/or level shifters and functions as an analog to digital converter to condition the output of the difference detector 34 into a digital signal to be read by a data processing circuit 38. (Although not part of the receiver 12 in the illustration of FIG. 3, persons of ordinary skill in the art will appreciate that the data processing circuit 38 (which can be a programmed microprocessor or other logic device) may optionally be part of the receiver 12.) The difference detector 34 and the signal conditioning circuit 36 cooperate to provide the data processing circuit 38 with a digital signal representative of logic "1" when the voltage on line 16 exceeds the voltage on line 18 by a predetermined amount, and to provide the data processing circuit 38 with a digital signal representative of logic "0" when the voltage on line 18 exceeds the voltage on line 16 by the predetermined amount.

For the purpose of saving power, one or more components of the receiver 12 are adapted to enter a reduced power state when the receiver 12 is not expecting to receive data. As used herein, a reduced power state is a state in which the subject component utilizes reduced or no power. The degree to which power is reduced relative to a normal power state is implementation dependent, and may be, for example, as much as a factor of fifty. The illustrated transmitter 10 enters the reduced power state when it detects that there has been no data to be transmitted in its queue for a predetermined time period. The illustrated receiver 12 or components thereof automatically enter the reduced power state when it detects that the transmitter 10 has not transmitted data for a predetermined time period. In other words, because the illustrated transmitter 10 constantly transmits data (either real or dummy data) over the link 14 when the transmitter 10 is in the wakened state, quieting of the differential serial data link (i.e., interruption of the data flow from the transmitter 10) for a predetermined time period is an in-band signal to the receiver 12 that it should enter the reduced power state. While this in-band signal is passive in the sense that the receiver 12 is looking for a lack of data signals as its signal to enter the reduced power state, persons of ordinary skill in the art will appreciate that an active in-band signal could alternatively be used in this role. For example, if an active reduced power protocol is desired, the transmitter 10 can be adapted to send a predetermined coded in-band signal to the receiver 12 via the differential serial data link 14 and the receiver 12 can be adapted to enter the reduced power state when it detects and decodes that predetermined coded in-band signal. Alternatively, an out-of-band signal can be used to cause the receiver 12 to enter the reduced power state. Optionally, whether using a passive in-band signaling protocol such as, for example, that described above, an active in-band signaling protocol, or an out-of-band signal to send the receiver 12 into the reduced power state, an acknowledgment signal may be transmitted back from the receiver 12 to the transmitter 10 via link 14 when the receiver 12 recognizes the in-band signal. In such circumstances, the transmitter 10, or a portion thereof, may remain in the normal power state until the acknowledgment is received to provide a mechanism to retry the reduce power signal if the receiver 12 does not acknowledge the first reduce power signal.

Returning to the illustrated example, namely, use of a passive in-band reduce power signal and active in-band wake-up signal, for the purpose of sending the receiver 12 into a reduced power state and for waking the receiver 12, the receiver 12 is further provided with a squelch detector 40. The illustrated squelch detector 40 is responsive to predetermined in-band signals received over the differential serial data link 14 to drive one or more of the components of the receiver 12 into the reduced power state and/or to waken one or more of those components. In the device shown in FIG. 3, the squelch detector 40 develops an output signal to drive a squelch valid circuit 44 to power down one or more components of the receiver 12 when the in-band signal(s) requesting the same are received over the differential link 14, and the squelch detector 40 develops an output signal which drives the squelch valid circuit 44 to power up the component in the reduced power state when in-band signal(s) requesting the same are received over the differential link 14.

While persons of ordinary skill in the art will readily appreciate that any of many different forms of in-band signals can be used to instruct the squelch detector 40 to send the receiver 12 or portions thereof into the reduced power state, in the illustrated device the in-band signal is a lack of a substantial DC difference between the lines 16, 18 of the differential serial data link 14 which occurs for at least a predetermined length of time (e.g., a predetermined number of bit cells). When the transmitter 10 determines that transmission of data via the link 14 is not desired (this determination may be made, for example, by detecting absence of data in the queue of the transmitter for some predetermined length of time), it will turn both of the transistors 20, 22 to the off state to stop sending differential data signals via the link 14. The lines 16, 18 are, thus, quieted such that no substantial voltage difference exists therebetween. This lack of a substantial voltage difference for at least a predefined time period is a predetermined in-band signal to the receiver 12 that the transmitter 10 does not intend to send data, and that the receiver or components thereof should enter the reduced power state. After quieting the lines 16, 18, the transmitter 10 can enter a reduced power state (unless an acknowledgment signal is expected as explained above). All of the components of the transmitter 10 that are not required to detect the need to awaken and to transition the transmitter 10 out of the reduced power state to the normal power (i.e., wakened) state are driven into the reduced power state to conserve power.

When the receiver 12 detects that no substantial DC voltage difference has occurred between the lines 16, 18 for at least the predefined time period, the receiver 12 or a portion thereof is transitioned from the normal power state to the reduced power state. All of the receiver 12 except for those components required to detect a wake-up signal and initiate the wake-up sequence are driven into the reduced power state to conserve power.

While persons of ordinary skill in the art will readily appreciate that any of many different forms of in-band signals can be used to instruct the squelch detector 40 to awaken the receiver 12 or portions thereof, in the illustrated device the in-band signal is a DC difference held substantially constant between the lines 16, 18 of the differential serial data link 14 for at least a predetermined length of time (e.g., a predetermined number of bit cells). When the transmitter 10 determines that transmission of data via the link 14 is desired (this determination may be made, for example, by detecting data in the queue), it transitions to the normal power (i.e., wakened) state and transmits the in-band wake-up signal to the receiver 12 via link 14. In particular, the transmitter 10 drives one or both of the lines 16, 18 to a predetermined DC voltage to create a predetermined voltage difference between the lines 16, 18 of the link 14 for at least a predetermined length of time. Persons of ordinary skill in the art will appreciate that the voltage difference between lines 16, 18 can be achieved by driving and holding one of the lines from an initial voltage level (which may optionally be zero) to a different voltage level for at least a predetermined time period, or by driving both lines simultaneously to different voltage levels (i.e., driving and holding a first one of lines 16, 18 to a first DC voltage and substantially simultaneously driving and holding the second one of the lines 16, 18 to a second DC voltage different from the first DC voltage for at least a predetermined time period). However, the illustrated example drives only one of the lines 16, 18 to the predetermined DC voltage and holds it there for at least a predefined time period.

When the receiver 12 detects that the DC voltage difference has been held between the lines 16, 18 for at least the predefined time period, the receiver 12 or a portion thereof is transitioned from the reduced power state to the normal power state. Once this transition to the normal power state is complete, the transmitter 10 transmits data to the receiver 12. Preferably, the transmitter 10 delays after sending the in-band wake-up signal for a sufficient time period to ensure the receiver 12 has appropriately wakened and is ready to receive data.

Alternatively, instead of being a DC signal as described above, the in-band wake-up signal may be implemented by an AC switching signal. For example, when the transmitter 10 determines that transmission of data via the link 14 is desired, it enters the normal power state and begins to alternatively switch the transistors 20, 22 on and off to transmit a plurality of voltage difference signals as the in-band wake-up signal to the receiver via link 14. The voltage difference signals may constitute "dummy data" in the sense that they do not contain any information. Their presence on the lines 16, 18 (i.e., voltage differences between the lines) for at least a predetermined time period constitute an in-band wake-up signal. When the receiver 12 recognizes this in-band signal, the receiver 12 or a portion thereof is transitioned from the reduced power state to the normal power state. Once this transition to the normal power state is complete, the transmitter 10 transmits data to the receiver 12. The transmitter 10 sends the dummy data for a sufficient time period to ensure the receiver 12 has appropriately wakened and is ready to receive data before sending actual data to the receiver.

Figure 4:
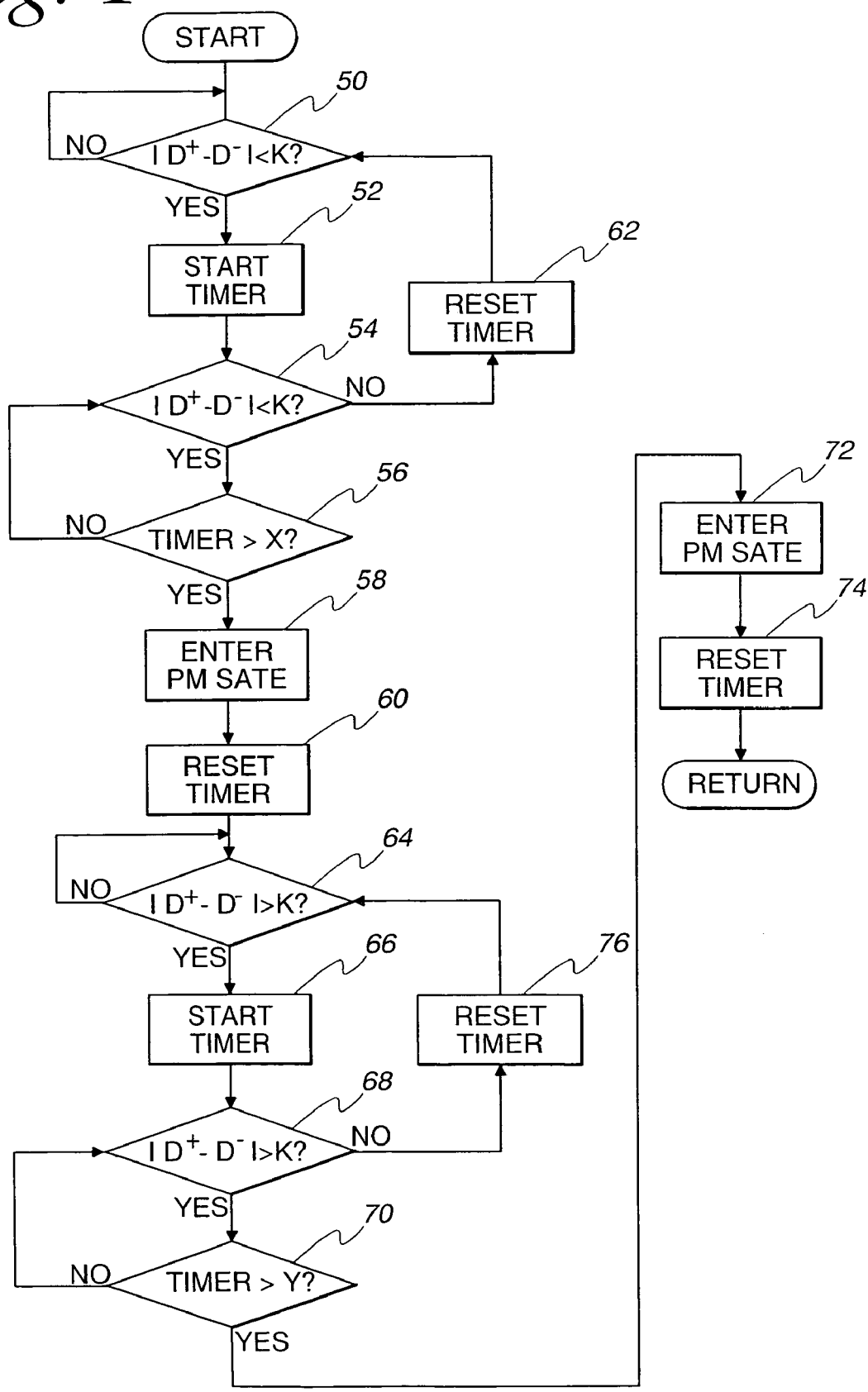
FIG. 4 is a flowchart illustrating the operation of the squelch detector of FIG. 3.

A more detailed view of the operation of the squelch detector 40 is shown in the flowchart of FIG. 4. In particular, at block 50, the squelch detector 40 determines if an absolute value of a voltage difference ($|D^+-D^-|$) between the lines 16, 18 of the differential serial data link 14 is less than or equal to a predetermined threshold (K). The absolute value of the difference is needed because the squelch detector 40 is interested only in the magnitude of the voltage difference, not its polarity, since voltage differences of sufficient magnitude over a sufficient period of time is indicative of a data transfer regardless of the polarity of the difference. If the absolute value of the voltage difference ($|D^+-D^-|$) between the lines 16, 18 of the differential serial data link 14 is less than or equal to the predetermined threshold (K, which may be, for example, 80 millivolts), a timer (which may be implemented by a flip-flop or a conventional timer) is started (block 52). Otherwise, the squelch detector continues to monitor the lines 16, 18 for a sustained quieted voltage event.

Assuming that the timer has been started (block 52), the squelch detector 40 enters a loop wherein the squelch detector 40 repeatedly checks to determine if the absolute value of the voltage difference ($|D^+-D^-|$) between the lines 16, 18 of the differential serial data link 14 is less than or equal to the predetermined threshold (K) (block 54) until a predetermined time period (X) has passed as measured by the timer (block 56). If the absolute value of the voltage difference ($|D^+-D^-|$) between the lines 16, 18 remains below or equal to the predetermined threshold (K) for the entire time period X, the receiver 12 enters a power management state (block 58) and the timer is re-set (block 60). Otherwise, the timer is re-set (block 62), and control returns to block 50.

When the receiver 12 is in the power management state, the squelch detector 40 monitors the lines 16, 18 to determine whether the absolute value of the voltage difference ($|D^+-D^-|$) between the lines 16, 18 of the differential serial data link 14 is more than the predetermined threshold (K) (block 64). If the threshold is passed by a voltage difference on the lines 16, 18, a timer is started (block 66) and the squelch detector 40 enters a loop wherein the squelch detector 40 repeatedly checks to determine if the absolute value of the voltage difference ($|D^+-D^-|$) between the lines 16, 18 of the differential serial data link 14 is greater than the predetermined threshold (K) (block 68) until a predetermined time period (Y) has passed as measured by the timer (block 70). If the absolute value of the voltage difference ($|D^+-D^-|$) between the lines 16, 18 remains above the predetermined threshold (K) for the entire time period Y, the receiver 12 exits the power management state (block 72) and the timer is re-set (block 74). Otherwise, the timer is re-set (block 76), and control returns to block 64.

Figure 5:
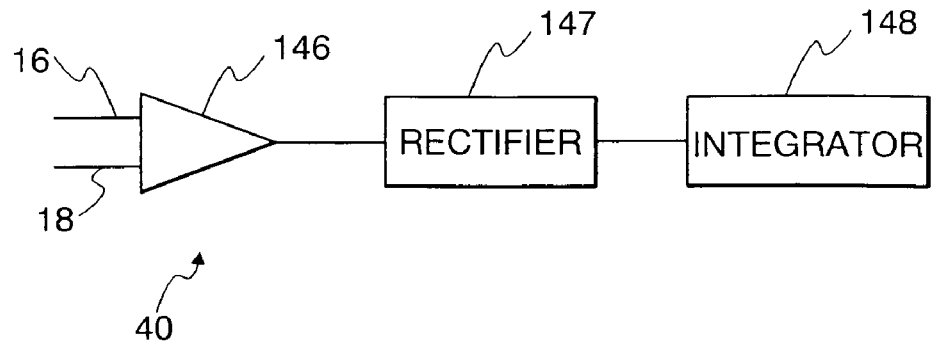
FIG. 5 is a more detailed view of an implementation of the squelch detector of FIG. 3.

A more detailed view of an exemplary squelch detector 40 is shown in FIG. 5. In that illustrated example, the squelch detector 40 includes a difference detector 146 to detect a voltage difference between the lines 16, 18 of the link 14 and to develop an output signal representative of that difference. The difference detector 146 of the illustrated squelch detector 40 is implemented by a differential operational amplifier having low gain so that small changes are not driven to a logic "1" or "-1". As shown in FIG. 5, the illustrated squelch detector 40 also includes a rectifier 147 and an integrator 148. The illustrated rectifier 147 has no gain and serves to ensure any non-zero input to the integrator has a positive polarity (i.e., the output of the rectifier 147 is the absolute value of the output of the difference detector 146). The integrator 148 functions as the timer described above and integrates the output signal of the rectifier 147 to develop an integrated signal. The integrated signal is preferably compared to a predetermined threshold. When the integrated signal falls below that threshold, the output of the squelch detector (which may optionally be the integrated signal) causes the squelch valid circuit 44 to signal to the receiver 12 or one or more components thereof to enter a reduced power state as discussed above. On the other hand, when the integrated signal exceeds that threshold, the output of the squelch detector 40 causes the squelch valid circuit 44 to signal the receiver 12 or one or more components thereof to waken from the reduced power state as discussed above.

Figure 6:
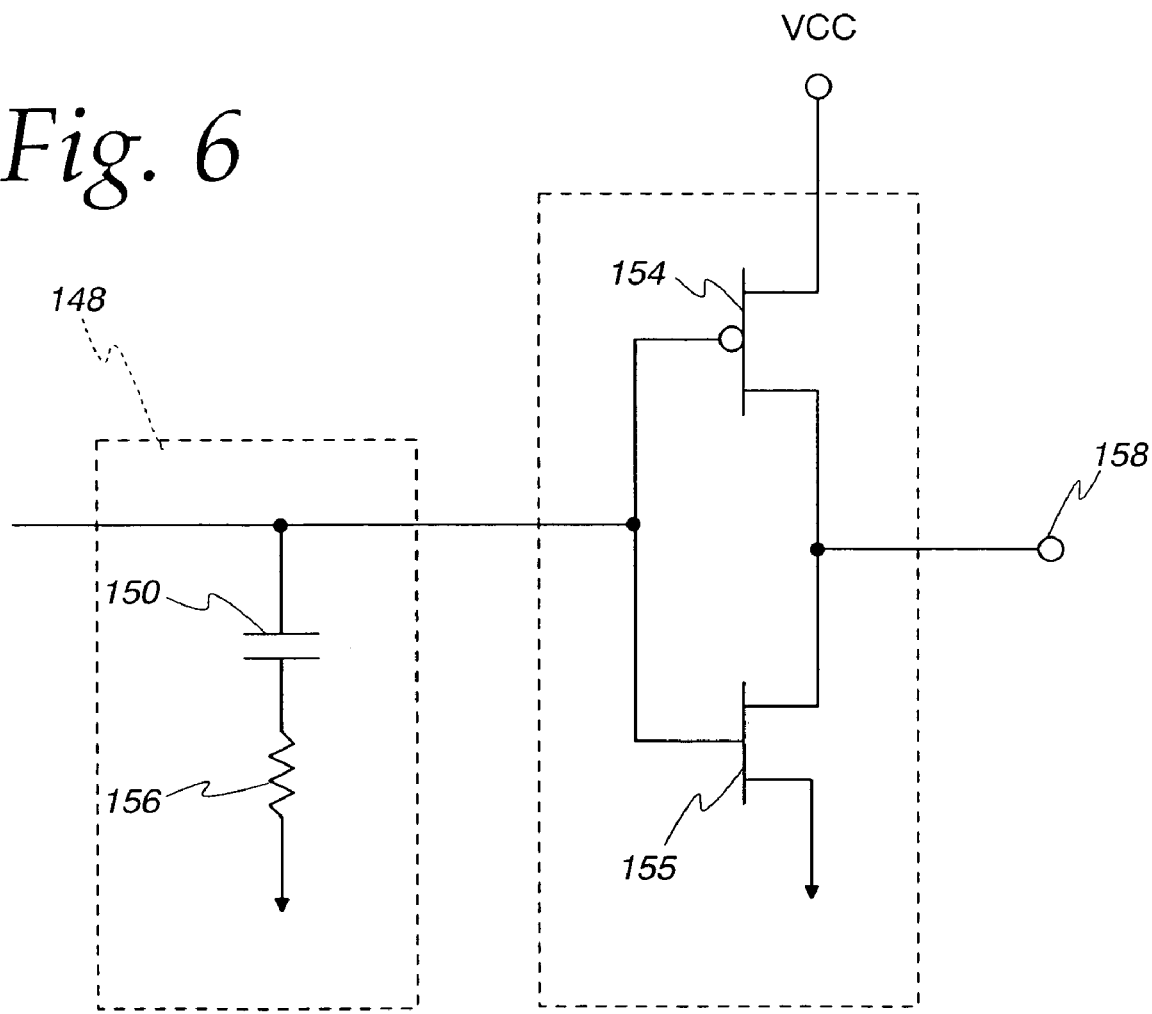
FIG. 6 is a more detailed view of an implementation of the integrator and squelch valid circuits of FIGS. 3 and 5.

One possible implementation of the integrator 148 is shown in detail in FIG. 6. As shown in that figure, the integrator 148 may optionally be implemented by a capacitor 150 in series with a resistor 156. Thus, in this implementation, integration of the output signal of the difference detector 146 is performed by charging the capacitor 150. Preferably, the capacitor 150 is sized such that, if the voltage across the capacitor 150 exceeds a predetermined threshold, the voltage difference detected by the detector 146 has been at substantially the appropriate level for at least the predetermined time period and the squelch valid circuit 44 will, therefore, signal the appropriate components in the reduced power state to waken. On the other hand, if the voltage across the capacitor 150 falls below the predetermined threshold, the voltage difference between the lines 16, 18 has been squelched and the squelch valid circuit 44 will, then, signal the appropriate components to enter the reduced power state.

One possible implementation of the squelch valid circuit 44 is shown in FIG. 6. As shown in that figure, the illustrated squelch valid circuit 44 includes a transistor 154 and a transistor 155. Persons of ordinary skill in the art will appreciate that transistor 154 can be implemented in many ways, but in the illustrated example, it is implemented by a PMOS transistor. Similarly, transistor 155 can be implemented in many ways, but in the illustrated example, it is implemented by an NMOS transistor. As shown in FIG. 6, a first terminal of the transistor 154 is coupled to a power supply. A second terminal of the transistor 154 is coupled to a first terminal of the second transistor 155. The second terminal of the transistor 155 is tied to ground. The gates of the transistors 154, 155 are connected to one another and in communication with the integrator 148. When the integrated signal reaches a sufficient level, the transistor 154 is turned on. On the other hand, when the integrated signal approaches a zero voltage, the transistor 155 is turned on. When transistor 154 is on, transistor 155 is off and vice versa. When the transistor 154 is on, a voltage is developed at the node 158 located between the second terminal of the transistor 154 and the first terminal of the transistor 155. When the transistor 155 is on, the node 158 is connected to ground.

The node 158 between the second terminal of the transistor 154 and the first terminal of the transistor 155 is connected to the sections or components of the receiver 112 to signal those section(s) or component(s) to move between the normal power state and the reduced power state as shown in FIG. 3. In particular, when the voltage across the capacitor 150 (i.e., the integrated signal) reaches a sufficient level to switch the transistor 154 into a conducting state, a signal is supplied to the component(s) of the receiver 12 in the reduced power state to arouse them to the normal power state.

For this example, the communication protocol used with the differential serial data link 14 requires continuous switching of data (e.g., actual data and dummy data), so the output signal of the difference detector 146 and rectifier 147 is sufficient to maintain the voltage across the capacitor 150 at a level sufficient to keep the transistor 154 in the conducting state. On the other hand, quieting the link 14 and, thus, causing the output of the difference detector 146 to drop to zero, results in discharging of the capacitor 150 in accordance with the RC time constant of the integrator 148 such that the voltage associated with the capacitor 150 falls below the switch-on threshold of the transistor 154 to thereby turn-off the transistor 154 and, such that when the capacitor voltage approaches zero, transistor 155 turns on. Turning-off the transistor 154 and turning on the transistor 155 drives the voltage at the node 158 toward ground to signal at least some portion(s) of the receiver 12 to enter the reduced power state.

As will be appreciated by persons of ordinary skill in the art, a transmitter 10 and a receiver 12 communicating over a differential serial data link 14 can be DC coupled (See FIGS. 7 and 9) or AC coupled (see FIGS. 10 and 11). AC coupling is often used in circumstances where the transmitter 10 operates at a different DC bias level than the receiver 12 (i.e., the common mode voltages of the transmitter 10 and receiver 12 are different). To maintain this DC voltage difference, AC coupling capacitors 160, 162 are connected in each of the lines 16, 18 of the link 14 as shown in FIGS. 10 and 11. In this context, the lines 16, 18 may be biased to a first DC voltage level and the in-band wake-up signal or data signals can be generated by beginning continuous switching of data (dummy or real) on the lines 16, 18, or by driving one or both of the lines 16, 18 to different DC level(s). This in-band signal can optionally cause a shift in the common mode voltage of the receiver 12. Such a shift can optionally be the wake-up signal to the receiver.

DC coupling, on the other hand, can be used in circumstances where no DC bias difference is present between the transmitter 10 and the receiver 12. In the DC coupling context, the AC coupling capacitors 160, 162 are omitted.

Figure 7:
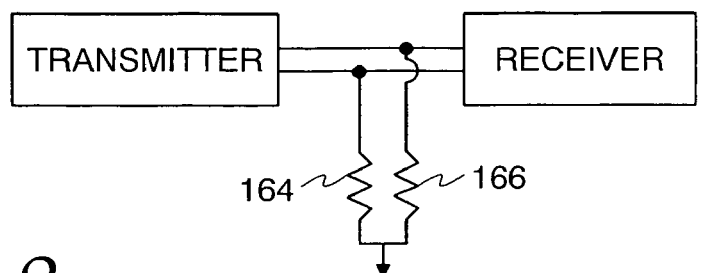
FIG. 7 is a circuit diagram of a differential link employing DC coupling and DC termination.
Figure 9:
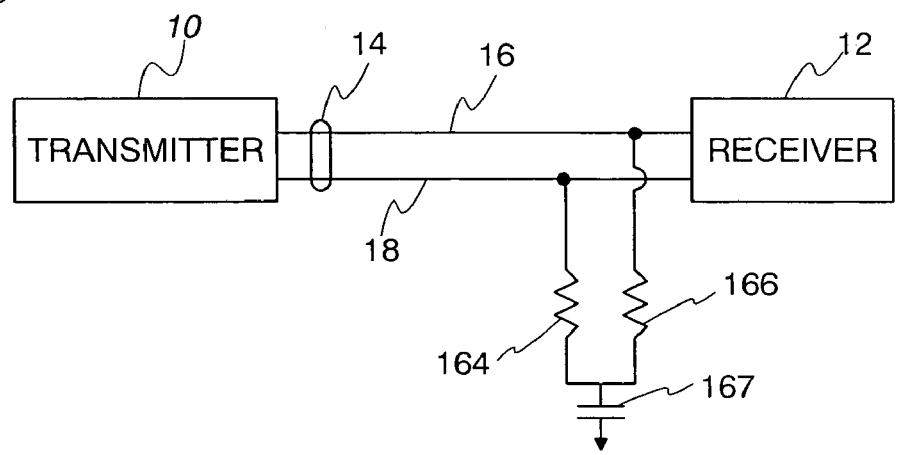
FIG. 9 is a circuit diagram of a differential link employing DC coupling and AC termination.

Persons of ordinary skill in the art will readily appreciate that shunt impedances 164, 166 are frequently used to impedance match the transmission lines 14, 16 to the receiver 12. Impedance matching is performed to avoid signal reflections as is well known. When only resistive impedances are employed as shown in FIGS. 7 and 10, the transmission lines 14, 16 are said to be DC terminated. When a capacitor 167 is coupled between the resistors 164, 166 and ground as shown in FIGS. 9 and 11, the lines 14, 16 are said to be AC terminated.

FIG. 7 illustrates a transmitter 10 and receiver 12 which are communicatively coupled by a differential serial data link 14. This circuit employs DC coupling and DC termination. FIG. 9 illustrates the transmitter 10, receiver 12, and differential link 14 using DC coupling and AC termination. FIG. 10 illustrates the transmitter 10, receiver 12, and differential link 14 using AC coupling and DC termination. FIG. 11 illustrates the transmitter 10, receiver 12, and differential link 14 using AC coupling and AC termination. Because of the presence of the AC coupling capacitors 160, 162, and/or the AC termination capacitor 167, the circuits of FIGS. 9–11 raise issues not present in the DC coupled/DC terminated circuit of FIG. 7.

Specifically, in an AC coupled and/or AC terminated system, when the transmitter 10 and receiver 12 are in their reduced power states, it is possible to permit the AC coupling and/or AC termination capacitors 160, 162, 167 to discharge. This is not, however, desirable if low latency is a requirement of the system. In other words, if it is desirable to wake-up the receiver 12 quickly to start communicating data, the AC coupling and termination capacitors 160, 162, 167 should not be permitted to discharge since communication should not begin until those capacitors 160, 162, 167 have reached their charged state. Moreover, permitting the AC coupling and/or termination capacitors 160, 162, 167 to drift between charged and uncharged states during the reduced power and/or transition (i.e., the state between the reduced power state and the normal power state) states could cause the voltage across them to move outside the operating range of the receiver 12.

Figure 8:
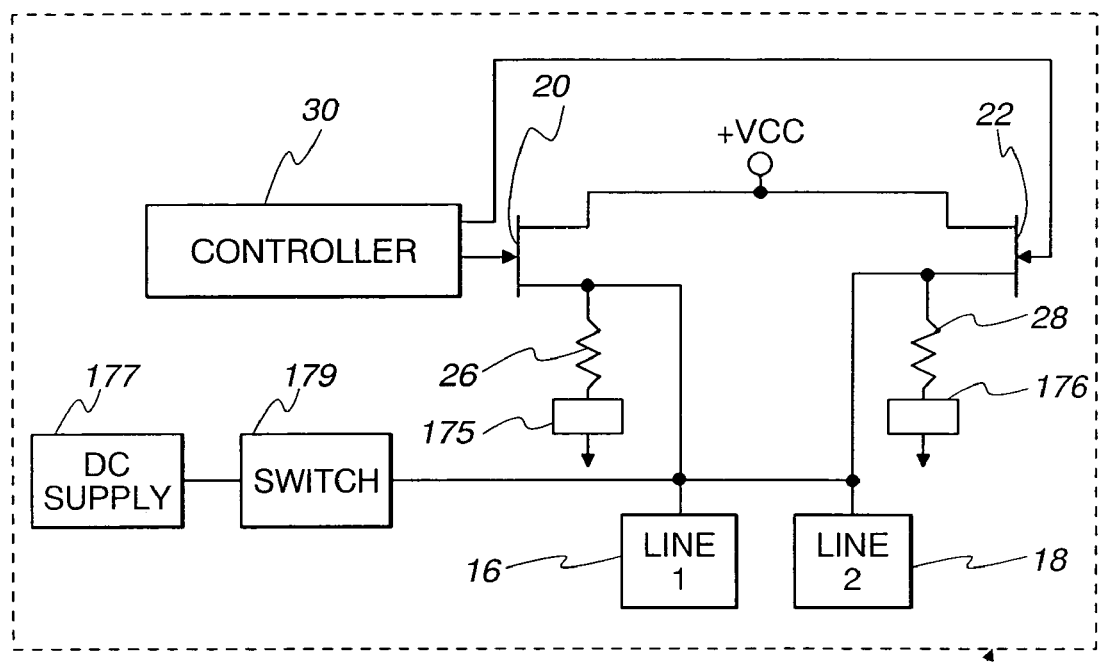
FIG. 8 is a schematic illustration of an alternative transmitter.

To avoid the delay associated with recharging the capacitors 160, 162, 167 after a period of no communication and to avoid possible errors caused by permitting voltage drifting outside the operating range of the receiver 12, the transmitter 10 is modified as shown in FIG. 8. In particular, the transmitter 10 is provided with switches 175, 176 connected in series with the termination resistors 26, 28, and a power supply 177 is selectively coupled to the lines 16, 18 via a switch 179 for biasing the lines 16, 18 to a desired DC voltage. When the transmitter 10 enters a reduced power state, the switches 175, 176 are closed to remove the termination resistors 26, 28 from the lines 16, 18. The ends of the lines 16, 18 are also coupled to the power supply 177 via switch 179. As a result, the voltage on the lines 16, 18 is not permitted to drift, but is instead maintained at the DC bias level of supply 177. Consequently, the AC coupling and/or termination capacitors 160, 162, 167 do not discharge, but also remain at roughly the DC level of the bias supply.

When a wake-up event is desired, lines 16, 18 are immediately made ready for communication by (1) opening the switches 175, 176 to reconnect the termination resistors 26, 28 to their respective lines 16, 18, and by (2) disconnecting the power supply 177 from the lines 16, 18 via switch 179. The power supply 177 can optionally remain connected to the lines 16, 18 at all times, but such an approach will utilize more power than selectively coupling and uncoupling that power supply 177 as discussed above. DC bias supply 177 has high impedance to reduce the usage of power. The termination resistors 26, 28 are effectively switched out of the circuit by the switches 175, 176 to save power. If they were not so treated, they would draw power from supply 177 with no benefit.

FIG. 10 illustrates an exemplary AC coupling circuit 168 which includes AC coupling capacitors 160, 162 and resistive shunt impedances 164, 166. Since capacitors 160, 162 function as an open circuit to a DC signal, if the in-band wake-up signal is a DC difference signal of at least a predetermined duration and a predetermined magnitude (i.e., the data rate is slower than the RC time constant of the AC coupling circuit 168), the AC coupling capacitors 160, 162 will not pass the entire DC signal. Instead, as shown in FIG. 12, while the transmitter output (i.e., the input signal to the AC coupling circuit 168) on, for example, line 16 appears as a square wave, the output from the AC coupling circuit 168 appears as a decaying pulse. The time rate of decay of the pulse is dependent on the RC constant of the AC coupling circuit (e.g., the dimensions of AC coupling capacitor 160 and shunt resistance 166). As a result, in the context of AC coupling and an in-band DC wake-up signal, the in-band wake-up signal reaching the receiver 12 and, thus, the difference detector 146 can have significantly less energy than the in-band wake-up signal generated by the transmitter 10 if the rate of switching is slower than the AC time constant. Accordingly, to ensure that the integrated signal exceeds the threshold required to wake-up the receiver 12 or portions thereof, the AC coupling capacitors 160, 162, the shunt resistances 64, 66, and the capacitor 150 of the integrator 48 must be properly dimensioned. While many different dimensioning arrangements can be selected, one possible example is to size the coupling capacitors 160, 162 at 1600 picofarads (pf), the shunt resistances 64, 66 at 50 ohms, the capacitor 150 of the integrator 148 at 1 pf, and the resistor 156 of the integrator 148 at 1000 ohms. In addition, the in-band signal must change fast enough to make the impedance of the AC coupling capacitors 160, 162 appear small. In other words, a slowly rising signal would not be the best choice for the wake-up signal because of the blocking effect of the AC coupling capacitors 160, 162. The RC time constant of the squelch detector 40 should be smaller than the RC time constant of the AC coupling circuit.

Because some receivers 12 may not be designed to receive signals that swing around zero volts, it is sometimes desirable to DC bias the input of the receiver 12 to a predetermined voltage. FIG. 10 shows one possible approach to achieving this end. In particular, a DC voltage source 170 is connected to lines 16, 18 to bias these lines to a desired level. Blocking capacitors 172, 174 are used as shown in FIG. 10 to maintain a DC separation between the DC biased input to the receiver 12 and the output of the AC coupling circuit 168. When the blocking capacitors 172, 174 are used, they should be dimensioned to be at least ten times larger than the capacitor 150 of the integrator 148. A DC bias 170 may also be used to maintain the input of the receiver 12 at a constant DC level when the receiver is in the reduced power state.

Persons of ordinary skill in the art will appreciate that the blocking capacitors 172, 174 and the DC bias 170 are selected to optimize the operation of the receiver 12. Thus, in some instances, it may be desirable to eliminate the blocking capacitors 172, 174 and terminate to the DC bias 170. In other instances, it may be desirable to eliminate the blocking capacitors 172, 174 and the DC bias 170. Persons of ordinary skill in the art are well aware of how to select an input biasing circuit to optimize operation of a receiver. This topic will, therefore, not be discussed in further detail here.

It is possible to use the number of in-band wake-up signals received by the receiver 12 to convey information. For example, if desired, the disclosed methods and apparatus can be modified to sequentially wake-up different sections of the receiver 12 in response to sequential in-band signals. A modified receiver having two different sections 176, 178 which can be separately wakened is shown in FIG. 13.

Figure 13:
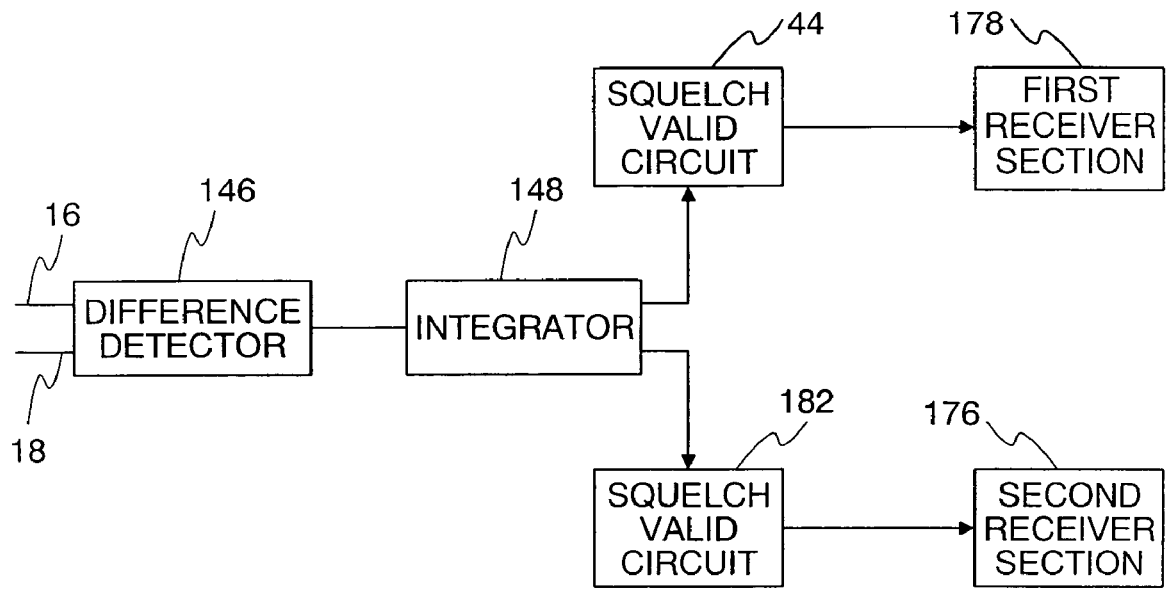
FIG. 13 is a schematic diagram of another receiving device constructed in accordance with the teachings of the invention.

As shown in FIG. 13, the modified receiver includes a difference detector 146, an integrator 148 and a squelch valid circuit 44 as described above. As shown in FIG. 13, the squelch valid circuit 44 functions to selectively signal at least a first section 178 of the receiver to enter or exit the reduced power state. In the modified receiver, a second squelch valid circuit 182 operates to selectively signal at least a second section 176 of the receiver to enter or exit the reduced power state. While, in this example, the first squelch valid circuit 44 signals its respective receiver section(s) 178 to exit the reduced power state in response to a first in-band wake-up signal as explained above, in this example the second squelch valid circuit 182 has a higher threshold than the first squelch valid circuit 44 such that it will not signal its respective receiver section(s) 176 to exit the reduced power state in response to the first in-band wake-up signal. Instead, the second squelch valid circuit 182 will only waken its respective receiver section(s) 176 if a second in-band wake-up signal received from the transmitter 10 via the link 14 causes the integrated signal output by the integrator 148 to reach a second level which is higher than the first level. Various known circuits can be used to make the second squelch valid circuit 182 non-responsive to the first in-band signal including, for example, level shifting circuits that cut the input to the gate of the PMOS and NMOS transistors of the second squelch valid circuit 182 (similar to the transistors 154, 155 of the squelch valid circuit 44) in half for a two in-band signal wake-up methodology.

The first and second in-band wake-up signals may be identical. Alternatively, the in-band wake-up signals may have differences in, for example, duration and/or magnitude. Although, for simplicity, only two in-band wake-up signals and two receiver sections 176, 178 have been discussed, persons of ordinary skill in the art will appreciate that any number of in-band wake-up signals can be used to awaken any number of receiver sections without departing from the scope or spirit of the invention. Either out-of-band reduced power signals, or in-band reduced power signals may be used to sequentially send the various sections 176, 178 of the receiver into the reduced power state. Alternatively, the in-band reduced power signaling approach discussed above can be used to send all desired sections of the receiver into the reduced power state such that, while piecemeal wake-up of the receiver is possible, the receiver portions cannot be made to enter the reduced power state in succession.

From the forgoing, persons of ordinary skill in the art will appreciate that methods and apparatus have been proposed for employing one or more in-band signal(s) to reduce power usage of a transmitter and receiver coupled via a differential serial data link. Advantageously, the use of in-band signal(s) avoids the use of side band signals and side-band connections, which translates into lower cost and higher bandwidth per signals needed. The disclosed methods are not clock-based and can be used with any differential link communication protocol. Furthermore, the disclosed methods and apparatus allow for significant power savings when data is not being transmitted. The latency for exiting and entering the power savings mode (i.e., the reduced power state) is also low (e.g., 3–200 nanoseconds and possibly as low as 1 bit cell (e.g., 400 picoseconds) at 2.5 gigatransfers per second).

Although it is advantageous to utilize the passive in-band signaling protocol described above to send the receiver 12 into the reduced power state and to utilize the active in-band wake-up protocol described above to waken the receiver 12 from the reduced power state to the normal power state, persons of ordinary skill in the art will readily appreciate that other approaches can be followed without departing from the scope or spirit of the invention. For example, either of the above-techniques can be used without the other (e.g, in-band signaling to exit the reduced power state in combination with an out-of-band signal to enter the reduced power state, passive in-band signaling to enter the reduced power state in combination with an out-of-band signal to exit the reduced power state, active in-band signaling protocol to enter the reduced power state in combination with the active in-band signaling protocol to exit the reduced power state, etc.) and/or both of the above techniques can be replaced with other signaling techniques (e.g., active in-band signaling protocol to enter the reduced power state in combination with out-of-band signaling to exit the reduced power state, etc). However, at least one of the reduced power signals should be an in-band signal (i.e., a signal transmitted via the differential serial data link 14).

Figure 14:
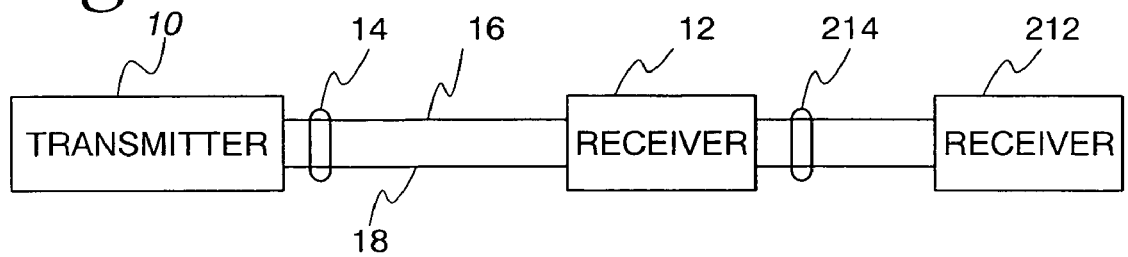
FIG. 14 is a schematic illustration similar to FIG. 1, but showing a second receiver and a second differential serial data link.

Although much of the above discussion has focused on waking a receiver 12 from a reduced power state to a wakened state, persons of ordinary skill in the art will appreciate that the in-band signaling techniques disclosed herein can be used to transition the receiver 12 between any two desired states. By way of examples, not limitation, the in-band signaling technique can be used to transition the receiver 12 from a reduced power state to a reset state, or to transition the receiver 12 from a reduced power state to a reduced power state wherein the in-band signal received by the receiver 12 is relayed over a second differential serial data link 214 to a second receiver 212 as shown in FIG. 14.

Although certain apparatus constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

What is claimed is:

1. For use with a transmitter, a receiver and a differential serial data link having at least two lines, a method comprising:
   detecting an absence of data to transmit which occurs for a predetermined period of time;

in response to the detection of the absence of data to transmit, transitioning at least a portion of the transmitter into a reduced power state;

detecting a first predetermined in-band signal received via the differential serial data link;

transitioning at least a portion of the receiver into a reduced power state in response to the first predetermined in-band signal;

detecting that communication is desired between the transmitter and the receiver;

transitioning at least the portion of the transmitter into a normal power state;

transmitting a second predetermined in-band signal from the transmitter to the receiver; and transitioning at least the portion of the receiver into a normal power state in response to the second predetermined in-band signal, wherein the transmitter and receiver are DC coupled and the differential serial data link is AC terminated at both the receiver and the transmitter, and wherein transitioning at least the portion of the transmitter into the reduced power state further comprises:

causing the at least two lines of the differential serial data link to disconnect at least two termination resistors associated with the transmitter; and connecting a DC bias voltage to the first and second lines of the differential serial data link at the transmitter.

2. For use with a transmitter, a receiver and a differential serial data link having at least two lines, a method comprising:

detecting an absence of data to transmit which occurs for a predetermined period of time;

in response to the detection of the absence of data to transmit, transitioning at least a portion of the transmitter into a reduced power state;

detecting a first predetermined in-band signal received via the differential serial data link;

transitioning at least a portion of the receiver into a reduced power state in response to the first predetermined in-band signal;

detecting that communication is desired between the transmitter and the receiver;

transitioning at least the portion of the transmitter into a normal power state;

transmitting a second predetermined in-band signal from the transmitter to the receiver; and transitioning at least the portion of the receiver into a normal power state in response to the second predetermined in-band signal, wherein the transmitter and receiver are DC coupled and the differential serial data link is AC terminated at the receiver and is DC terminated at the transmitter, and wherein transitioning at least the portion of the transmitter into the reduced power state further comprises:

causing the at least two lines of the differential serial data link to disconnect at least two termination resistors associated with the transmitter; and connecting a DC bias voltage to the first and second lines of the differential serial data link at the transmitter.

3. For use with a transmitter, a receiver and a differential serial data link having at least two lines, a method comprising:

detecting an absence of data to transmit which occurs for a predetermined period of time;

in response to the detection of the absence of data to transmit, transitioning at least a portion of the transmitter into a reduced power state;

detecting a first predetermined in-band signal received via the differential serial data link;

transitioning at least a portion of the receiver into a reduced power state in response to the first predetermined in-band signal;

detecting that communication is desired between the transmitter and the receiver;

transitioning at least the portion of the transmitter into a normal power state;

transmitting a second predetermined in-band signal from the transmitter to the receiver; and transitioning at least the portion of the receiver into a normal power state in response to the second predetermined in-band signal, wherein the transmitter and receiver are AC coupled and the differential serial data link is DC terminated at both the transmitter and the receiver, and wherein transitioning at least the portion of the transmitter into the reduced power state further comprises:

causing the at least two lines of the differential serial data link to disconnect at least two termination resistors associated with the transmitter; and connecting a DC bias voltage to the first and second lines of the differential serial data link at the transmitter.

4. For use with a transmitter, a receiver and a differential serial data link having at least two lines, a method comprising:

detecting an absence of data to transmit which occurs for a predetermined period of time;

in response to the detection of the absence of data to transmit, transitioning at least a portion of the transmitter into a reduced power state;

detecting a first predetermined in-band signal received via the differential serial data link;

transitioning at least a portion of the receiver into a reduced power state in response to the first predetermined in-band signal;

detecting that communication is desired between the transmitter and the receiver;

transitioning at least the portion of the transmitter into a normal power state;

transmitting a second predetermined in-band signal from the transmitter to the receiver; and transitioning at least the portion of the receiver into a normal power state in response to the second predetermined in-band signal, wherein transitioning at least the portion of the transmitter into the reduced power state further comprises:

causing the at least two lines of the differential serial data link to disconnect at least two termination resistors associated with the transmitter; and connecting a DC bias voltane to the first and second lines of the differential serial data link at the transmitter, wherein the transmitter and receiver are AC coupled and the differential serial data link is AC terminated at the receiver and DC terminated at the transmitter.

5. For use with a transmitter, a receiver and a differential serial data link having at least two lines, a method comprising:

detecting that no communication is currently desired between the transmitter and the receiver;

transitioning at least a portion of the transmitter into a reduced power state;

detecting a first predetermined in-band signal received via the differential serial data link;

transitioning at least a portion of the receiver into a reduced power state in response to the first predetermined in-band signal;

detecting that communication is desired between the transmitter and the receiver;

transitioning at least the portion of the transmitter into a normal power state;

transmitting a second predetermined in-band signal from the transmitter to the receiver; and transitioning at least the portion of the receiver into a normal power state in response to the second predetermined in-band signal, wherein transitioning at least the portion of the transmitter into the reduced power state further comprises:

causing the at least two lines of the differential serial data link to disconnect at least two termination resistors associated with the transmitter; and connecting a DC bias voltage to the first and second lines of the differential serial data link at the transmitter.

* * * * *

UNITED STATES PATENT AND TRADEMARK OFFICE
CERTIFICATE OF CORRECTION

PATENT NO. : 7,200,186 B2  
APPLICATION NO. : 10/097338  
DATED : April 3, 2007  
INVENTOR(S) : Zale T. Schoenborn It is certified that error appears in the above-identified patent and that said Letters Patent is hereby corrected as shown below:

Column 14, Line 53 should read;

--connecting a DC bias ~~voltane~~ voltage to the first and second lines--

Signed and Sealed this

Fifth Day of June, 2007

JON W. DUDAS  
*Director of the United States Patent and Trademark Office*